(12) United States Patent
Desai et al.

(10) Patent No.: US 10,649,958 B2
(45) Date of Patent: May 12, 2020

(54) ALLOCATING MEMORY RESOURCES IN A FILE SYSTEM BASED ON AFFINITY DATA

(71) Applicant: VMWARE, INC., Palo Alto, CA (US)

(72) Inventors: Asit Desai, Palo Alto, CA (US);
Prasanna Aithal, Bangalore (IN);
Bryan Branstetter, Berkeley, CA (US);
Rohan Pasalkar, Palo Alto, CA (US);
Prasad Rao Jangam, Palo Alto, CA (US); Mahesh S Hiregoudar,
Bangalore (IN); Pradeep Krishnamurthy, Bangalore (IN);
Srinivasa Shantharam, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 399 days.

(21) Appl. No.: 15/615,847

(22) Filed: Jun. 7, 2017

(65) Prior Publication Data

US 2018/0267986 A1 Sep. 20, 2018

(30) Foreign Application Priority Data

Mar. 15, 2017 (IN) .............................. 201741008923

(51) Int. Cl.
*G06F 16/00* (2019.01)
*G06F 16/13* (2019.01)
*G06F 16/16* (2019.01)
*G06F 16/11* (2019.01)
*G06F 16/17* (2019.01)

(52) U.S. Cl.
CPC ............ *G06F 16/13* (2019.01); *G06F 16/113* (2019.01); *G06F 16/164* (2019.01); *G06F 16/1727* (2019.01)

(58) Field of Classification Search
None
See application file for complete search history.

(56) References Cited

U.S. PATENT DOCUMENTS

| 6,434,663 B1 * | 8/2002 | Grimsrud | G06F 1/3268 711/111 |
| 2002/0124137 A1 * | 9/2002 | Ulrich | G06F 3/0613 711/113 |
| 2018/0246646 A1 * | 8/2018 | Karkkainen | G06F 3/0608 |

* cited by examiner

*Primary Examiner* — Bai D Vu

(57) ABSTRACT

The systems described herein are configured to enhance the efficiency of memory usage and access in a VM file system data store with respect to allocating memory in large and small file block clusters using affinity metadata and propagating and maintaining the affinity metadata in support of the described allocation. During storage of file data, an affinity identifier of the file data is determined. The affinity identifier is used to identify a large file block cluster and a small file block cluster within the identified large file block cluster. The file data is stored in the selected small file block cluster and affinity metadata of the selected small file block cluster is updated to reflect the storage of the file data.

20 Claims, 9 Drawing Sheets

ALLOCATING MEMORY RESOURCES IN A FILE SYSTEM BASED ON AFFINITY DATA

RELATED APPLICATIONS

Benefit is claimed under 35 U.S.C. 119(a)-(d) to Foreign Application Serial No. 201741008923 filed in India entitled "ALLOCATING MEMORY RESOURCES IN A FILE SYSTEM BASED ON AFFINITY DATA", on Mar. 15, 2017, by VMware, Inc., which is herein incorporated in its entirety by reference for all purposes.

The present application Ser. No. 15/615,847 is related in subject matter to U.S. patent application Ser. No. 15/615,848, which is incorporated herein by reference.

BACKGROUND

Existing virtual machine (VM) data stores use symmetric clustered file systems in virtualized environments to host VM disks and data. In a typical setup, a VM data store is provided in such a way that it is accessible to one or many host devices. A single VM data store may allow access by many different VMs which are run or executed on the connected host devices.

The VM data stores organize physical space as a collection of file blocks and larger file block resources known as clusters. Access to file block clusters is limited to one host device at a time and coordinated by on-disk locks coupled with a periodic heartbeat mechanism. However, as a result of the data store being shared between multiple host devices and/or VMs, contention for the resources of clusters often results in increased access and/or allocation times for files in the data store. For instance, when resource allocations are occurring simultaneously from the same or different host devices for different files, the file system (e.g., a virtual machine file system (VMFS), etc.) and/or VM data store must ensure that there is no contention for resource clusters from which the resources will be allocated.

Further, resource allocations are sometimes provided to host devices in unique physical positions in the data store based on an identifier of the host, ensuring that resources allocated to a host are located near each other in the data store. In an example, a hash function may be applied to a unique identifier (such as a universal unique identifier (UUID)) of a host and the result of the hash function may be used as a starting location in the physical memory of the data store to begin locating free resource clusters and allocating resources to the host. However, in some cases, hosts may access, alter, or take control of files that were previously allocated to and/or created by other hosts (e.g., a VM may be migrated from a first host to a second host). During and after such an event, the file data pertaining to affected files and/or file data become fragmented, with parts of the data being stored in a memory region associated with one host while other parts of the data are stored in a different memory region associated with another host. Because the resource allocations of the affected file data are spread across several locations in memory, the occurrence of resource contention for the associated resource clusters increases substantially.

DESCRIPTION OF THE DRAWINGS

The present description will be better understood from the following detailed description read in light of the accompanying drawings, wherein:

In FIGS. 1 to 9, the systems are illustrated as schematic drawings. The drawings may not be to scale.

DETAILED DESCRIPTION

The systems described below associate the physical space allocated to a file to a specific region of physical space of a VM data store based on a distinct affinity identifier of the file. By making this association between a file and a physical storage region, the efficiency of memory usage and access in a VM file system data store is enhanced with respect to allocating memory resources, reading and/or writing to a file, migrating file data between hosts, etc. During storage of file data, an affinity identifier, or affinity key, unique to the file data is determined. The affinity identifier is used to select a physical location in the data store, including file block(s) (a file system resource allocated to a file) in small file block clusters (collections of file blocks represented in on-disk metadata) and large file block(s) (contiguous regions of multiple file blocks) in associated large file block clusters (collections of large file blocks represented in on-disk metadata). The file data is stored in file blocks of selected small file block cluster(s) and affinity metadata of the selected small file block cluster(s) is updated to reflect the storage of the file data. As a result, the file and associated file data become associated with the particular small file block cluster (s) and/or location in the data store. The selected physical location is associated with the file data, such that future resource allocations associated with the file data will tend to be allocated near the selected physical location. In the event that a different host seeks resource allocation associated with the file data, the affinity identifier will be used to identify free resources for allocation in proximity to the selected physical location, resulting in reduced fragmentation of the file data and reduced resource contention as a result.

Figure 1:
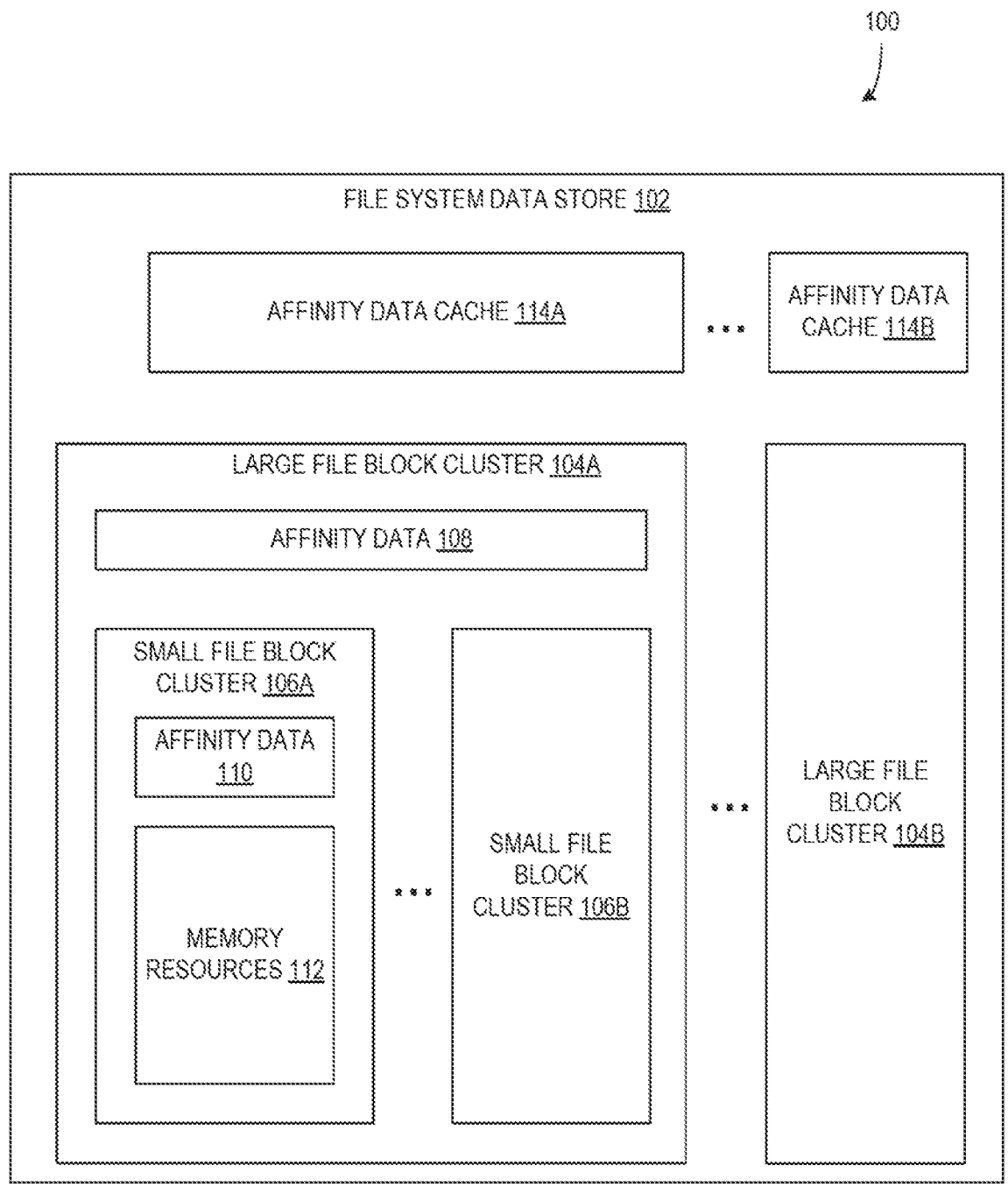
FIG. 1 illustrates a block diagram of a system including a file system data store with large file block clusters and small file block clusters according to an embodiment.

FIG. 1 illustrates a block diagram of a system 100 including a file system data store 102 with large file block clusters 104A-104B and small file block clusters 106A-106B according to an embodiment. The file system data store 102 is a data structure for storing files and other data for use by a computing device, apparatus, or the like. The file system data store 102 may be stored in memory on one or more memory devices, hard drives, or the like and may be accessed over interfaces such as a network interface, hard drive interface, etc. Further, the data store 102 may include a memory architecture or organization as defined by an operating system, file system, or the like that is used by a computing device with which the data store 102 is associated.

In an example, the file system data store 102 use symmetric clustered file systems for virtualized environments to host virtual computing instances (VCIs) and data. The file system data store 102 provides access to one or many host devices. The file system data store 102 may host many different VCIs which are then run or executed on the connected host devices. An example may include a VMFS data store hosting multiple VMs which may be executed/run by ESXi hypervisors on connected host devices. The physical space of the data store 102 is organized as a collection of file blocks (e.g., a file system resource allocated to a file that may contain file data) and larger file block resources known as clusters. Access to file block clusters is limited to one host device at a time, as a file block cluster includes locks that prevent more than one host accessing the cluster simultaneously. This often causes contention for the resources of clusters in data stores.

Large file block clusters 104A-104B are part of a hierarchical data structure in the file system data store 102. Each large file block cluster (LFBC) represents a group of memory resources of the data store 102 that can be located by accessing the associated LFBC. Memory resources are further divided between small file block clusters (e.g., small file block clusters 106A-106B, etc.) within each LFBC. Each small file block cluster (SFBC) includes memory resources 112 in the form of file blocks, which may be allocated and/or released during the interaction of computing devices and/or components with the data store 102.

Large file block clusters 104A-104B further include affinity data (e.g., affinity data 108, etc.) stored as metadata. The affinity data 108 of LFBC 104A includes data associated with the state and arrangement of allocated memory resources in all of the SFBCs associated with LFBC 104A (e.g., SFBCs 106A-106B). Additionally, each SFBC includes affinity data (e.g., affinity data 110 on SFBC 106A, etc.) stored as metadata that includes data associated with the state and arrangement of allocated memory resources within the file blocks of the associated SFBC.

Affinity data, or metadata, (e.g., affinity data 108, 110, etc.) includes an affinity identifier associated with a file to which memory resources have been allocated as well as a number or value of the memory resources allocated to the file. For instance, a file may be stored across five file blocks of allocated memory. The affinity data of the file includes an affinity identifier defined for the file and a memory allocation value of five file blocks. Further, affinity data of a SFBC may include a value or indication of available free memory resources in the SFBC. The affinity data of all files associated with allocated memory in a SFBC is stored in the metadata of the SFBC (e.g., affinity data 110, etc.). Further, the affinity data of all files associated with allocated memory in SFBCs within a LFBC is stored, with identifiers of associated SFBCs, in the metadata of the LFBC (e.g., affinity data 108, etc.). Storing the affinity data of all the SFBCs of a LFBC in the affinity data of the LFBC enables the system to quickly determine SFBCs that have free resources, SFBCs that have no associated affinity identifiers, or SFBCs are associated with a particular affinity identifier, without querying each SFBC separately. Affinity data caches as described below further streamline the process and reduce resource contention for the LFBC.

Each LFBC (e.g., LFBCs 104A-104B, etc.) is associated with an affinity data cache (e.g., affinity data caches 114A-114B, etc.). An affinity data cache stores a snapshot, or version, of the affinity data of an associated LFBC and is stored and/or located apart from the LFBC such that the affinity data cache is accessible without contending for access resources of the LFBC. For instance, LFBC 104A and associated affinity data 108 may be stored on disk and the affinity data cache 114A may be stored in memory (e.g., RAM, etc.) of an associated computing device such that, when entities, processors, other computing devices, or the like query the affinity data stored on the affinity data cache 114A, access to the LFBC 104A and associated SFBCs by other entities is not limited, blocked, interrupted, etc.

In an example, the file system data store 102 is used to store data of host computing devices which host virtual computing instances (VCIs), such that the organization of data stored on the file system data store 102 includes file systems used by the host computing devices as well as virtual file system organizations of the hosted VCIs. The files associated with hosted VCIs may be entirely stored in the file system data store 102, such that a VCI may be efficiently migrated from one host computing device to another host computing device. Migration of a VCI may include sharing locations of files pertaining to the VCI on the file system data store 102 between the original host computing device and the new host computing device. After migration, the new host computing device accesses and/or uses files of the VCI stored on the file system data store 102 to host, run, and/or execute the migrated VCI. Because the files in the file system data store 102 are organized based on affinity identifiers and/or other affinity data and not based on the host computing devices that create and/or store the files on the file system data store 102, the files need not be moved or transferred to other locations in the file system data store 102 during or after the migration. The same affinity identifier-based file locations may be used by the original host computing device and the new host computing device. For instance, a VM running on a hypervisor of a host device may be paused such that the state of the VM is saved to a VMFS data store shared by multiple host devices. The VM may then be migrated to another host device by providing the new host device the location of the files pertaining to the VM. The new host device may then access the files of the VM on the VMFS data store in order to resume execution of the VM using its own hypervisor.

Figure 2:
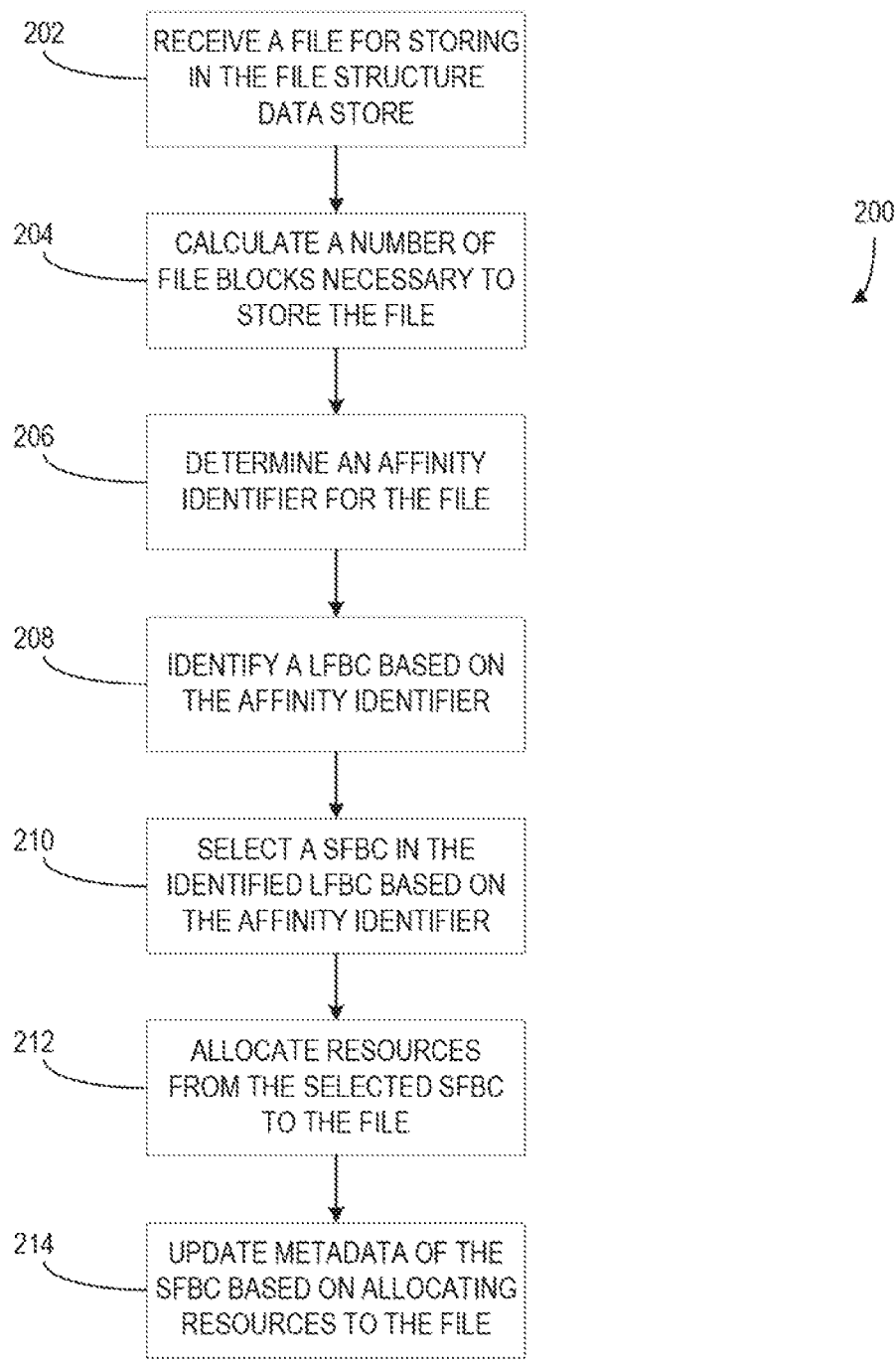
FIG. 2 illustrates a flow chart of a method of storing a file in memory based on associated affinity data according to an embodiment.

FIG. 2 illustrates a flow chart of a method 200 of storing a file in memory based on associated affinity data according to an embodiment. At 202, a computing device, such as a host computing device, hosting a data store receives a file for storing in a data store (e.g., file system data store 102, etc.). Based on an operating system and/or file system in use on the computing device, a number of file blocks necessary to store the file is calculated at 204.

At 206, an affinity identifier of the file is determined. The affinity identifier is substantially unique and associated with the file such that the file can be identified based on the affinity identifier. In an example, the affinity identifier of a file is determined to be the inode address, file name or file descriptor (e.g., an on-disk representation of a file consisting of file metadata and addressing information, an "inode" value, etc.) of the file when the file is a thin file (e.g., a file that is only allocated file blocks or other resources upon the first writing of data, rather than at the creation of the file, etc.). Alternatively, the affinity identifier of a file is determined to be an inode address, file name or descriptor of a parent directory of the file when the file is a non-thin file, such as a thick file, which is a file for which resources are fully allocated when the file is first created.

Once an affinity identifier is determined, a LFBC is identified based on the affinity identifier at 208. Affinity data of available LFBCs, which includes affinity data of SFBCs associated with the available LFBCs, is queried for the presence of the affinity identifier. A LFBC is identified when the LFBC and/or a SFBC associated with the LFBC has affinity data that includes the affinity identifier and the LFBC has sufficient free memory resources. Alternatively, if none of the available LFBC include the affinity identifier in affinity data, a LFBC that has sufficient free memory resources may be identified. Querying the affinity data of available LFBCs may be done by querying affinity data caches associated with the LFBCs prior to accessing the LFBCs themselves. In an example, a hash function or the like is applied to the affinity identifier of the file to obtain a start point memory location in the memory space of the data store and the LFBC and/or associated SFBC that contains the obtained start point is identified.

At 210, a SFBC in the identified LFBC is selected based on the affinity identifier. The affinity data of the available SFBCs on the LFBC may be queried to identify SFBCs that include the affinity identifier of the file and sufficient free resources to store the file and/or file data. Because, the affinity data of all SFBCs of a LFBC is stored in the affinity data cache of the LFBC, the SFBC may be initially targeted based on querying the affinity data cache. However, selecting the SFBC may include confirming at the SFBC metadata that the SFBC affinity data includes the affinity identifier and that the SFBC has sufficient free memory resources. In some examples, the file and/or file data may be split between multiple SFBCs. Further, if a SFBC that includes the affinity identifier and sufficient free resources cannot be located, a SFBC that has no affinity identifiers and sufficient free resources and/or a SFBC that simply has sufficient free resources may be selected. This is described in greater detail below.

Upon selecting a SFBC, memory resources of the selected SFBC are allocated to the file at 212. The allocation may include writing file data of the file to one or more file blocks in the SFBC. Further, metadata may be written and/or flags may be set to indicate that the newly allocated file blocks/ memory resources are allocated. At 214, metadata of the SFBC is updated based on the allocation of memory resources to the file. For instance, the affinity data of the SFBC may be updated to include the affinity identifier of the file as well as the amount or number of resources and/or file blocks allocated to the file. If the affinity identifier is already present in the metadata of the SFBC, only the amount of memory resources allocate may be changed in the SFBC metadata. Alternatively, or additionally, the affinity data in the SFBC metadata may include memory locations of allocations based on affinity identifiers. In this case, the memory locations of allocation associated with the affinity identifier of the file would be created and/or updated to include the newly allocated memory resources.

Figure 3:
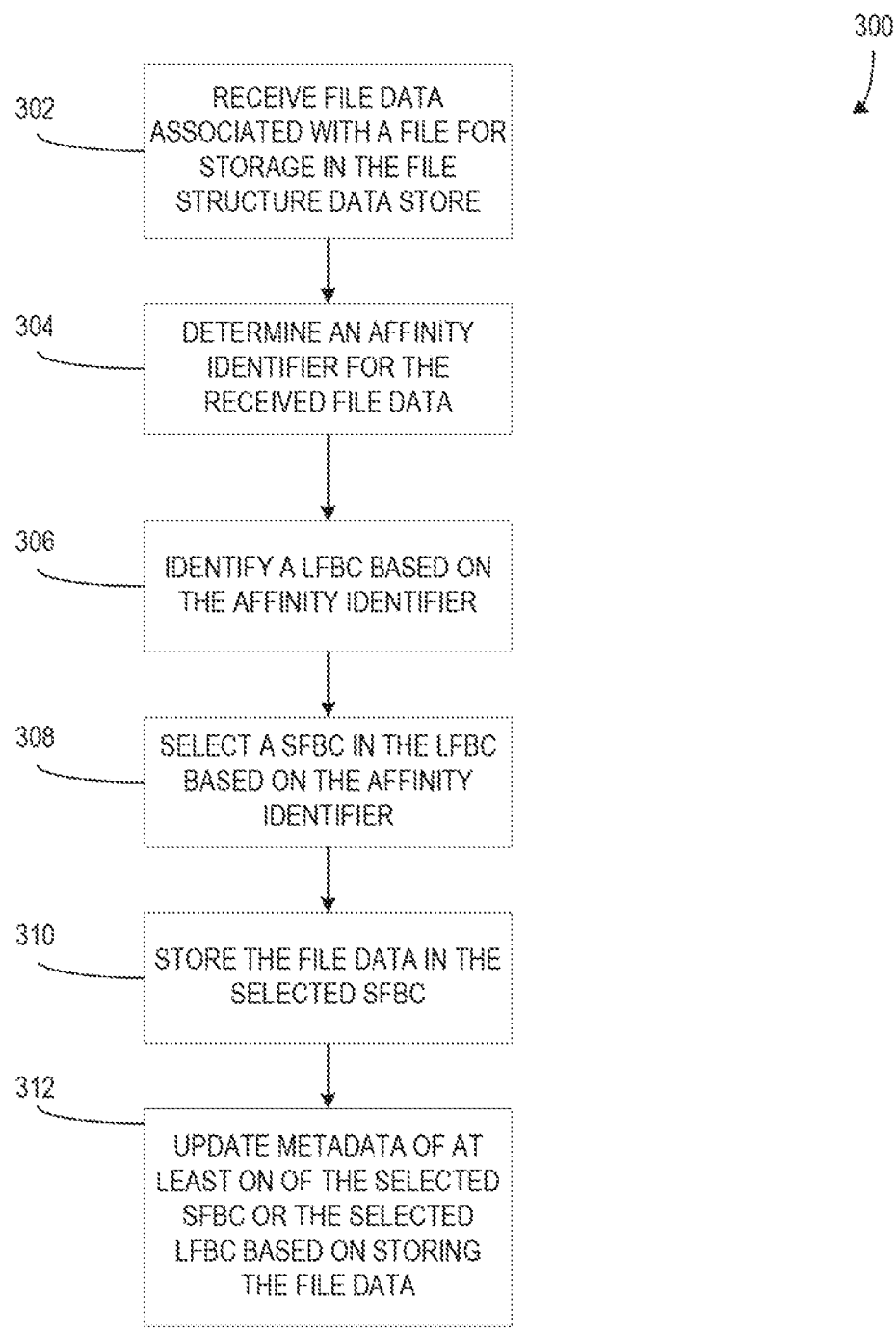
FIG. 3 illustrates a flow chart of a method of storing file data in memory based on associated affinity data according to an embodiment.

FIG. 3 illustrates a flow chart of a method of storing file data in memory based on associated affinity data according to an embodiment. At 302, file data associated with a file for storage in a data store is received. The file data may include data of the entire file, partial data of the file, data for updating/editing the file, etc. The file data may be received at the data store from a host computing device and may be associated with the host computing device and/or a virtual computing instance hosted by the host computing device.

At 304, an affinity identifier is determined for the file data. As described above, the affinity identifier is substantially unique and associated with the file such that the file can be identified based on the affinity identifier. In some examples, the affinity identifier of a file is determined to be the file descriptor of the file when the file is a thin file. Alternatively, the affinity identifier of a file is determined to be a file descriptor of a parent directory of the file when the file is a non-thin file. Further, the received file data may be partial data of the file such that the file may already have an affinity identifier. In that case, the received file data may include the affinity identifier and/or sufficient descriptive data of the file such that the affinity identifier can be derived at 304.

At 306, a LFBC is identified for storage of the file data. As described above with respect to 208, Affinity data of available LFBCs is queried for the presence of the affinity identifier. If a LFBC is with affinity data that includes the affinity identifier and the LFBC has sufficient free memory resources, the LFBC is identified. Alternatively, if none of the available LFBC include the affinity identifier in affinity data, a LFBC that has sufficient free memory resources may be identified. Querying the affinity data of available LFBCs may be done by querying affinity data caches associated with the LFBCs prior to accessing the LFBCs themselves. In an example, a hash function or the like is applied to the affinity identifier of the file to obtain a start point memory location in the memory space of the data store and the LFBC that contains the obtained start point is identified.

At 308, a SFBC is selected from available SFBCs in the identified LFBC. Selecting the SFBC is substantially the same as described above with respect to 210. Once the SFBC is selected, at 310, the file data is stored in the selected SFBC. When the SFBC includes data associated with the affinity identifier already, the newly stored file data may be stored with or in proximity to the location of the present data associated with the affinity identifier, such that all data associated with the affinity identifier is located in the same region in memory, if possible.

At 312, the metadata (e.g., the affinity data, etc.) of the selected SFBC and/or the identified LFBC are updated based on storing the file data on the SFBC. The affinity data of the SFBC may be updated to include the affinity identifier associated with the stored file data, if it was not present already. Further, the SFBC affinity data is updated to reflect newly allocated memory resources and may be updated to reflect a reduced or altered value for currently free memory resources. The affinity data of the LFBC may also be updated with the affinity data of the SFBC, as well as any affinity data cache associated with the LFBC. However, updating of the LFBC may be delayed and updated later based on affinity data propagation techniques that are described in greater detail below.

Figure 4:
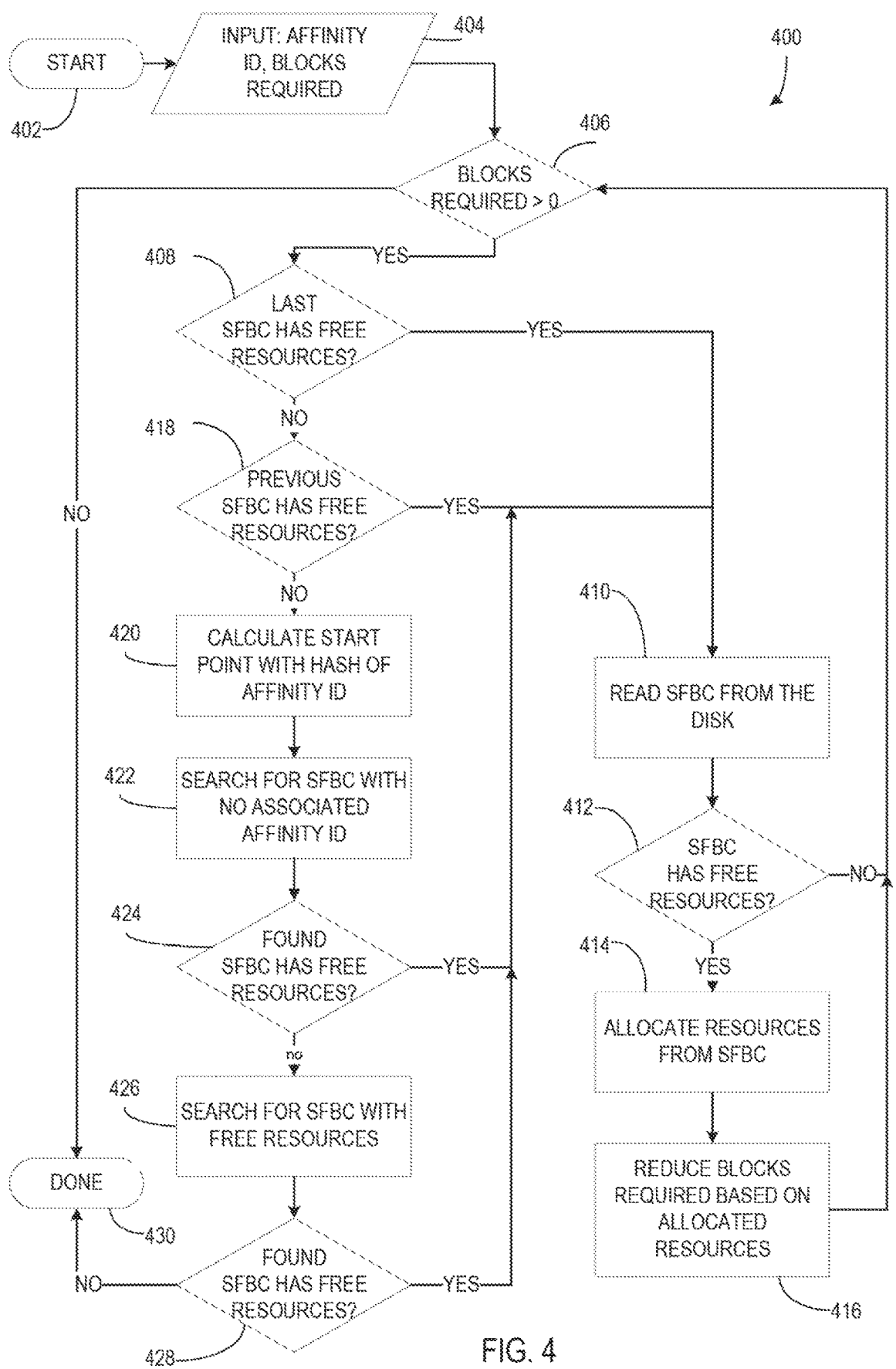
FIG. 4 illustrates a flow chart of a method of selecting a small file block cluster in which to store file data according to an embodiment.

FIG. 4 illustrates a flow chart of a method 400 of selecting a small file block cluster in which to store file data according to an embodiment. At 402, the method 400 begins with input data 404, which includes an affinity identifier and a number of file blocks required. At 406, the number of file blocks required is checked to ensure it is greater than zero. If it is not, then no more file data needs to be stored and the process ends at 430. If the number of file blocks required is greater than zero, a SFBC must be selected to store the file data.

At 408, the last SFBC used with the associated affinity identifier is checked to determine if it has free memory resources. The last SFBC to be used with an affinity identifier may be included in the affinity data of the particular SFBC as well as the affinity data of the associated LFBC and/or affinity data cache, such that the LFBC affinity data may be queried to identify the last SFBC used with an identifier. Alternatively, or additionally, the file descriptor or other metadata of the file may include an identifier of the last SFBC to be used for storage of the file. In this way, the last SFBC to be used is prioritized when more file data associated with the affinity identifier is received for storage, such that data associated with the affinity identifier is likely to be stored in a particular region of the data store, rather than fragmented/distributed across multiple regions.

If it is determined that the last SFBC to be used with the affinity identifier has free resources based on querying the LFBC affinity data and/or the affinity data cache of the LFBC, at 410, the SFBC affinity data is read directly from the disk location in which it is stored to confirm the accuracy of the queried LFBC affinity data. Because the SFBC affinity data is kept up to date and the LFBC affinity data is updated asynchronously, or "lazily", it is necessary to confirm that the queried LFBC affinity data is accurate, enabling the use of "optimistic concurrency control" between the LFBC and SFBC. If, at 412, it is determined that the SFBC has free resources based on directly querying the SFBC, free resources of the SFBC are allocated to the received file data. Once allocated, the number of blocks required for storage of the file data is reduced by the number of blocks allocated in the SFBC at 416. For instance, if the file data to be stored requires 100 file blocks and the SFBC has only 50 blocks available for allocation, the 50 blocks are allocated to the file data and the required number of blocks is reduced from 100 to 50. Further, the affinity data of the SFBC may be updated to reflect the newly allocated memory resources and the affinity identifier associated therewith. Also, an affinity data update request may be sent to the LFBC or other data store management component indicating that the LFBC affinity data should be updated to reflect the changes to the SFBC affinity data when possible. Then, the process returns to 406 to continue storing the remaining file data.

If, at 412, it is determined that the SFBC does not have free resources based on directly querying the SFBC, indicating that the LFBC affinity data and/or the affinity data cache of the LFBC include stale data regarding the SFBC, the process returns to 406 to continue storing the remaining data. Further, an affinity data update request may be sent to the LFBC or other data store management component as described above to cause the LFBC affinity data and/or affinity data cache to be updated when possible.

If, at 408, the last SFBC used with the affinity identifier does not have any free resources, or if no such SFBC exists, all SFBCs previously used with the affinity identifier are checked for free resources at 418. The previously used SFBCs may be identified by querying the affinity data of the LFBC and/or affinity data cache to find all SFBCs that include the affinity identifier. Alternatively, or additionally, the affinity data of the LFBC and/or affinity data cache may include a list or similar data structure of SFBCs that have been used previously with each affinity identifier, enabling a query based on the affinity identifier to quickly return a list of previously used SFBCs associated therewith. Further, identifiers of the previously used SFBCs may be stored within the metadata of the file to be stored (e.g., in a bitmap stored in the file metadata indicating each of the SFBCs from which resource allocations were made to the file, etc.). These identifiers, as well as an identifier of the last SFBC used for the file, may be updated within the file metadata during resource allocation and/or deallocation to the file.

If, at 418, a previously used SFBC is indicated to have free resources, the SFBC affinity data is read from the disk at 410 and the process continues as described above. However, if no previously used SFBC is indicated to have free resources, or if no previously used SFBC exists, a new SFBC for storage of the file data must be identified.

At 420, a start point in the memory space of the file system data store (e.g., file system data store 102, etc.) is calculated by applying a hash function to the affinity identifier. The start point indicates a region in the memory space of the data store that is substantially unique to the particular affinity identifier used, such that file data from different files is spread out throughout the data store memory space. Starting from the start point, the SFBCs of the LFBC at the start point are searched, at 422, to find a SFBC that has no associated affinity identifiers in affinity data. A lack of associated affinity identifiers indicates that it is likely the SFBC in question is not associated with any files yet and is a good region begin storing file data for the current file. If, at 424, a found SFBC with no associated affinity identifiers is indicated to have free resources, the SFBC affinity data is read from disk at 410 and the process continues as described above. However, if no SFBC with no associated affinity identifiers and free resources can be identified, the LFBC (or the affinity data cache associated with the LFBC) is searched, at 426, to find any SFBC with free resources. In this search, any SFBC that is indicated to have free space may be selected. If a SFBC found as a result of this search has free resources at 428, the SFBC affinity data is read from disk at 410 and the process continues as described above. If the found SFBC does not have free resources, or if no SFBC with free resources is found, the process ends at 430. An alternative LFBC may be selected for storage of the file data and the above-described process used to identify appropriate SFBC(s) for storage therein.

In an example, when affinity data of a SFBC is updated based on memory allocation or it is otherwise determined that the affinity data of a LFBC and/or affinity data cache is stale or inaccurate, an affinity data update request for the LFBC in question is sent and/or an affinity data update request flag is set on the LFBC such that affinity data of the LFBC and/or the affinity data cache is updated by a host computing device or the like when possible. Updating of the affinity data of the LFBC and/or affinity data cache may be performed according to the affinity data propagation methods described below, or other similar methods.

Figure 5:
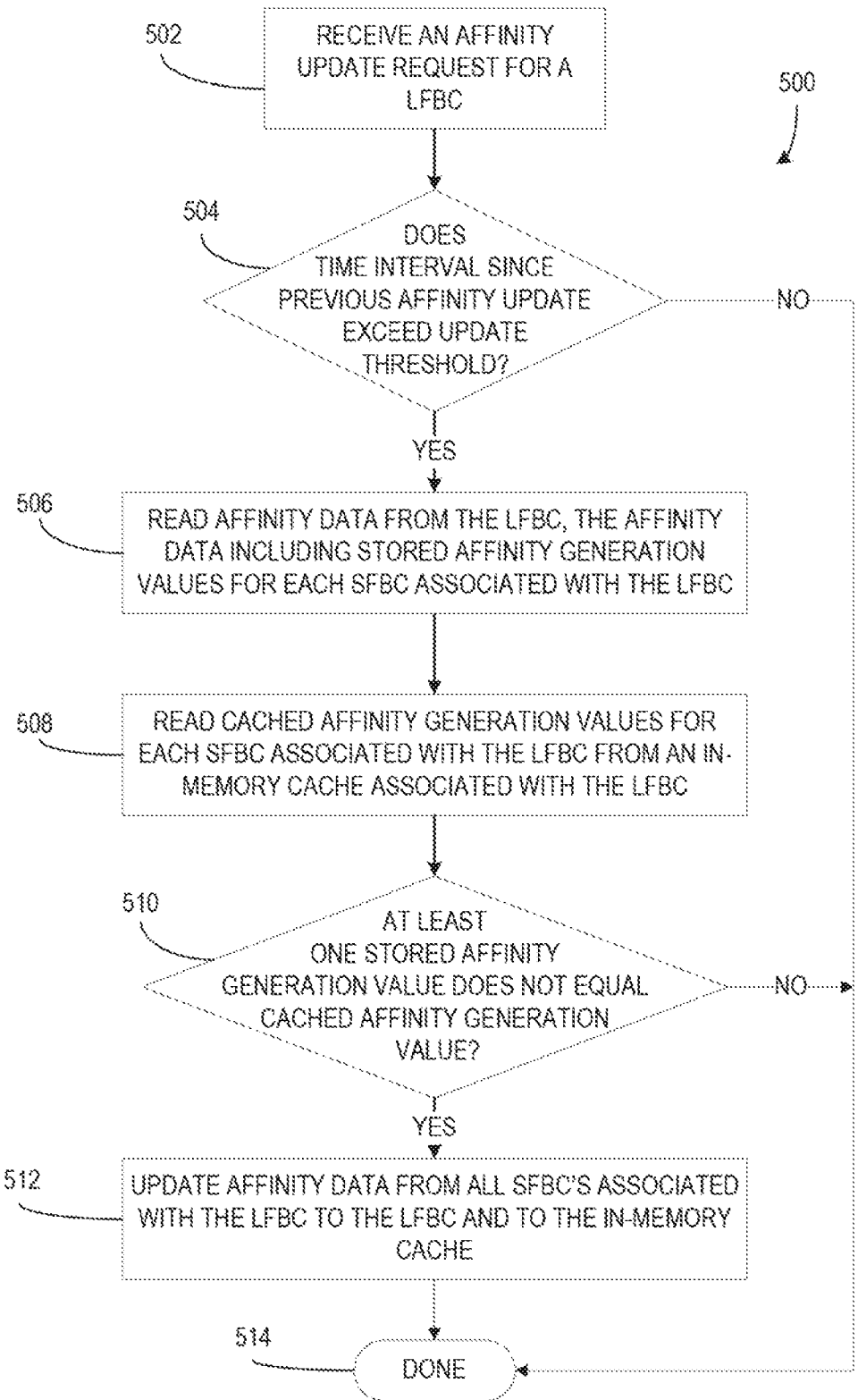
FIG. 5 illustrates a flow chart of a method of propagating affinity data from small file block clusters to an associated large file block cluster according to an embodiment.

FIG. 5 illustrates a flow chart of a method 500 of propagating affinity data from small file block clusters to an associated large file block cluster according to an embodiment. At 502, an affinity data update request is received for a LFBC. The affinity data request may be the result of an update to an SFBC of the LFBC and/or detection of stale affinity data of the LFBC. At 504, it is determined whether the time interval since the last affinity data update of the LFBC exceeds an update threshold. The update threshold is defined as a length of time such that the LFBC affinity data is only updated periodically, rather than in response to every change to the affinity data of the numerous SFBCs associated with the LFBC. For instance, the LFBC may have an update threshold of 60 seconds. The affinity data of the LFBC is updated only if enough time has passed since the last update to exceed the defined update threshold at 504.

At 506, affinity data is read from the LFBC. The affinity data includes stored affinity generation numbers or values for each SFBC associated with the LFBC. An affinity generation value represents a version of the affinity data of the SFBC. It is increased each time the affinity data of the SFBC is changed, such that the state of the affinity data stored in other locations, such as the LFBC affinity data and/or the affinity data cache, can be tracked by comparing the affinity generation values of each instance of the affinity data to the affinity generation value of the affinity data on the SFBC. For instance, if an SFBC has an affinity generation value of 1 and memory resources of the SFBC are allocated to a file, changing the affinity data of the SFBC, the affinity generation value of the SFBC may be updated to 2.

At 508, cached affinity generation values for each SFBC associated with the LFBC are read from the affinity data cache associated with the LFBC. The cached affinity generation values and stored affinity generation values are compared at 510. If one of the stored generation values does not equal the equivalent cached generation value, affinity data from all SFBCs is read directly from the SFBCs and used to update the affinity data of the LFBC and the associated affinity data cache at 512.

Figure 6:
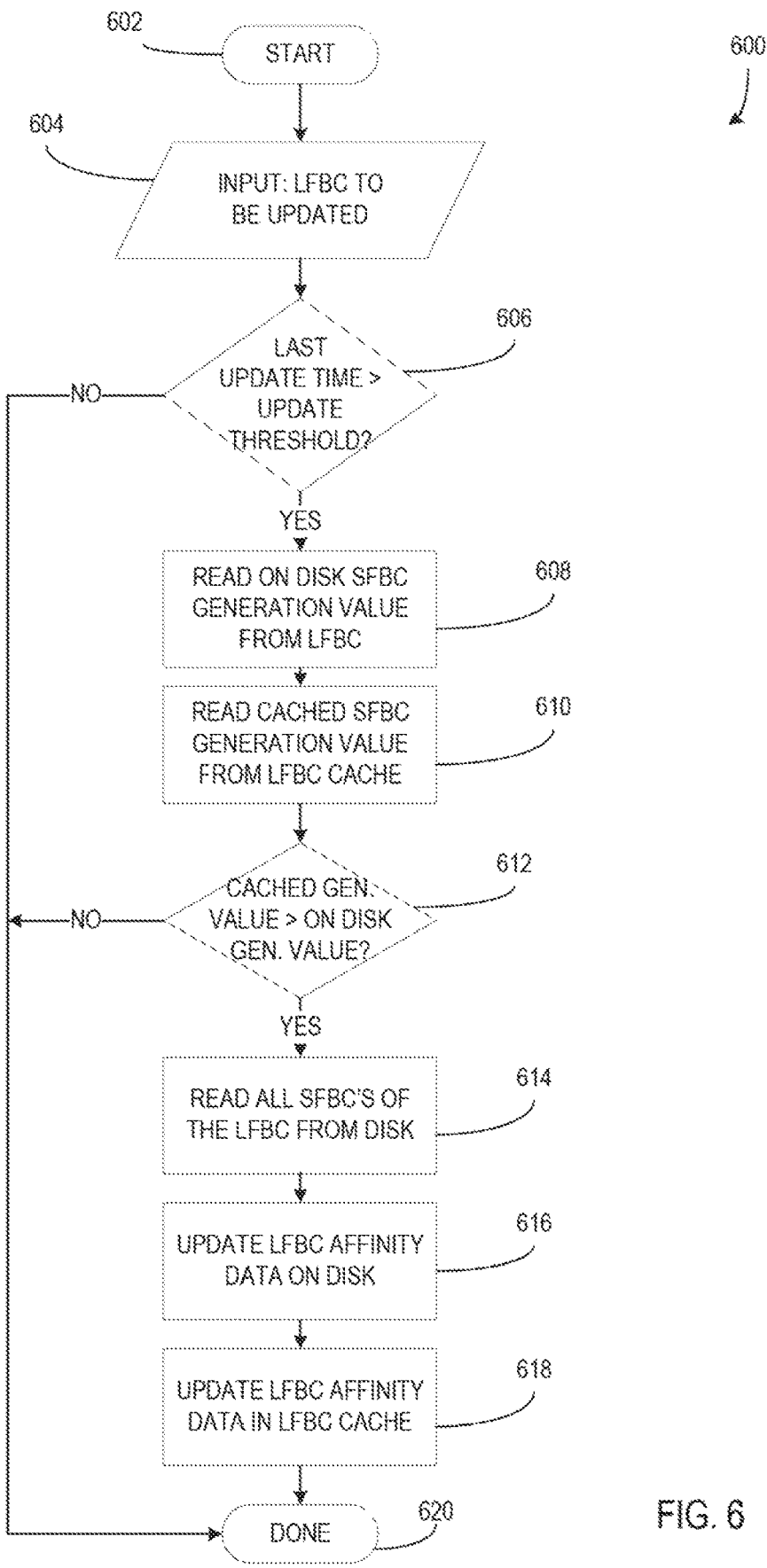
FIG. 6 illustrates a flow chart of a method of propagating affinity data from small file block clusters to an associated large file block cluster based on generation values of affinity data according to an embodiment.

FIG. 6 illustrates a flow chart of a method 600 of propagating affinity data from small file block clusters to an associated large file block cluster based on generation values of affinity data according to an embodiment. Method 600 begins at 602, with input 604 including an LFBC to be updated. At 606, it is determined whether the last update time for the LFBC occurred more than a defined time interval (e.g., an update threshold, etc.) in the past. If a sufficient amount of time has passed, the SFBC generation values stored on the LFBC are read at 608. The cached SFBC generation values are then read from the LFBC affinity data cache at 610.

If none of the cached generation values from the affinity data cache are greater than the equivalent stored generation values of the LFBC on disk at 612, the process proceeds to completion at 620. However, if any cached generation value from the affinity data cache is greater than the equivalent stored generation values from the LFBC on disk, then the on disk affinity data of the LFBC and affinity data cache must be updated. At 614, affinity data of all SFBCs associated with the LFBC is read from the SFBCs on disk. The affinity data from the SFBCs is updated to the LFBC affinity data on disk at 616. At 618, the affinity data from the SFBCs is updated to the cached affinity data on the affinity data cache, and at 620, the process is completed.

Figure 7:
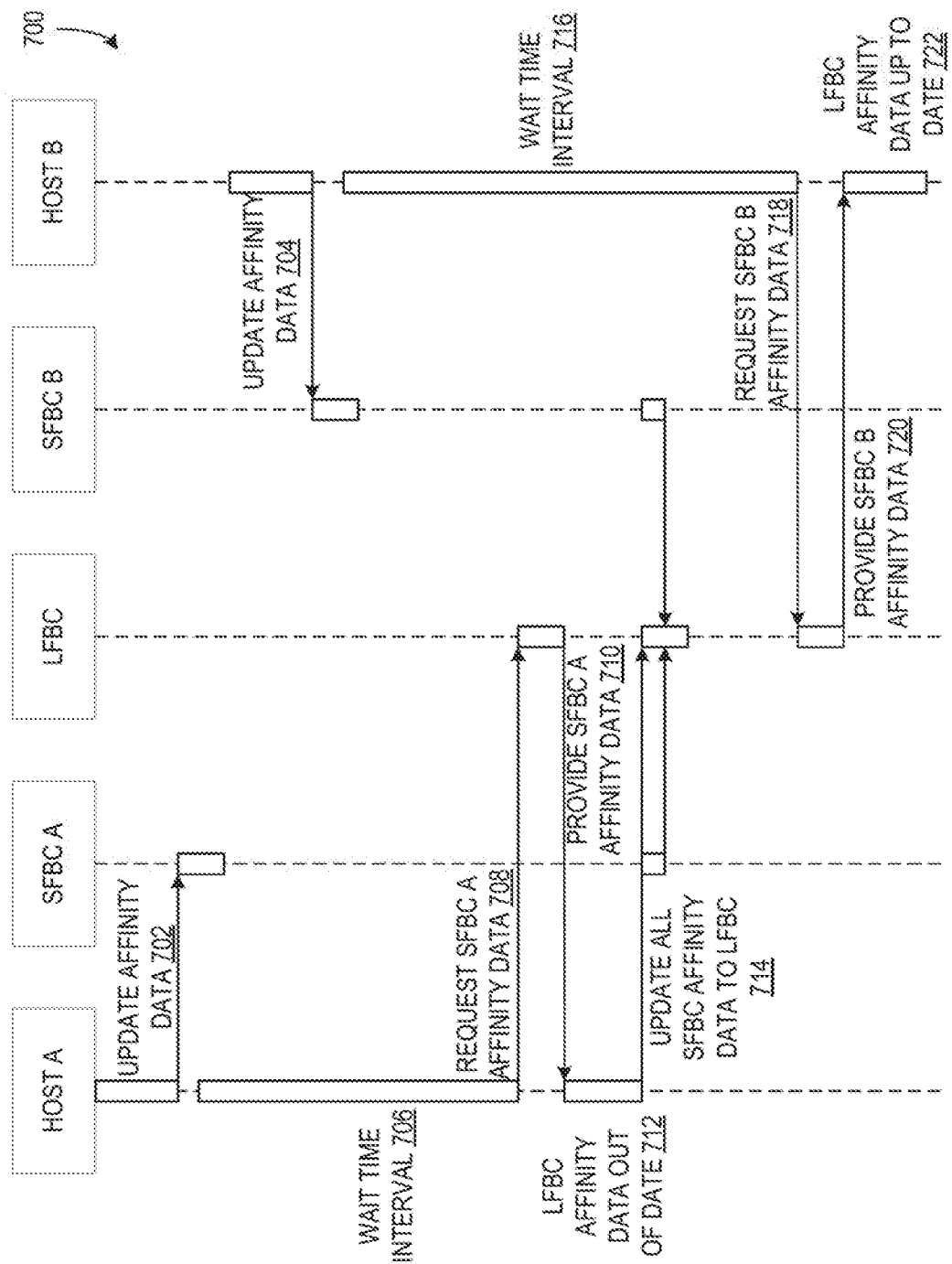
FIG. 7 illustrates a sequence diagram of a method of propagating affinity data from small file block clusters to an associated large file block cluster based on a time interval according to an embodiment.

FIG. 7 illustrates a sequence diagram of a method of propagating affinity data from small file block clusters to an associated large file block cluster based on a time interval according to an embodiment. At 702, Host A updates the affinity data of the SFBC A. The affinity data update may as a result of Host A storing or otherwise changing the memory resource allocation of SFBC A. For instance, Host A may update the affinity data of SFBC A as a result of allocating memory of SFBC A to write file data to SFBC A. The affinity data of SFBC A may be updated to include an affinity identifier and/or a number or value of memory resources allocated by Host A. In an example, updating the affinity data of the SFBC A may include incrementing or otherwise updating an affinity data generation value of the SFBC A on the SFBC A and/or an affinity data cache.

After Host A updates the affinity data of SFBC A, Host B updates the affinity data of SFBC B at 704. In this example, SFBC A and B are associated with the same LFBC as shown. As described above, the affinity data update may be as a result of changing the memory allocation of SFBC B by the Host B. Further, an affinity data generation value of SFBC B may be incremented and/or updated on SFBC B and/or an affinity data cache.

Host A waits for a time interval at 706. The time interval may be defined by Host A, the LFBC, and/or a computing device or system by which the LFBC is controlled and/or managed. For instance, the time interval may be 60 seconds. After waiting the time interval, Host A requests SFBC A affinity data from the LFBC to check for consistency of affinity data between the SFBC A and/or affinity data cache and the LFBC affinity data on disk at 708. In some examples, Host A may, additionally or alternatively, retrieve affinity data from an affinity data cache associated with the LFBC. The LFBC provides the requested SFBC A affinity data to Host A at 710. The affinity data may include affinity data generation values as described above.

The SFBC A affinity data from the LFBC is compared, at 712, against the affinity data that Host A previously updated on SFBC A at 702. The affinity data from the two sources does not match due to the affinity data from the LFBC being out of date, as the SFBC A affinity data from SFBC A has been updated. The affinity data may include, for instance, an affinity generation value that tracks a version of the affinity data of the SFBC A as described above. If the affinity generation value of the SFBC A affinity data from the LFBC is less than the affinity generation value of the SFBC A affinity data from the SFBC A itself, it would indicate that the affinity data of the LFBC is stale or out-of-date and should be updated.

After determining that the affinity data between the SFBC A and LFBC does not match, the Host A, at 714, causes the LFBC to update stored affinity data from all SFBCs associated with the LFBC, including SFBC A and B. Host A may read affinity data from all SFBCs of the LFBC and provide the newly read affinity data to the LFBC for storage. Further, an affinity data cache of the LFBC may be updated based on the newly read affinity data from all the SFBCs.

Meanwhile, Host B waits for a time interval at 716 after updating SFBC B. The time interval of Host B may be the same as that of Host A, or it may be different. In this case, the time interval of Host B extends past the time when Host A causes the affinity data of the LFBC to be updated based on all SFBCs of the LFBC. At 718, Host B requests the affinity data of SFBC B stored on the LFBC to check for consistency. At 720, the LFBC provides the stored SFBC B affinity data to the Host B. Because the LFBC has been recently updated by Host A, Host B finds that the affinity data (e.g., the affinity generation values, etc.) of the LFBC is up to date and matches the SFBC B affinity data at 722, such that the LFBC affinity data does not need to be updated. In this way, affinity data is propagated from SFBCs, which are kept up to date at all times, to the LFBC, which is asynchronously updated with respect to the SFBCs. The LFBC, which includes numerous SFBCs, may require nearly constant affinity data updates in order to maintain perfect consistency with the affinity data of each SFBC, so by updating it based on a time interval and requests from host devices, LFBC affinity data updates occur less often and are handled more efficiently, resulting less resource contention for the LFBC. Alternatively, Host B may find that the affinity data generation value of the SFBC B on the LFBC is greater than or newer than the affinity data generation value stored by the Host B. The Host B may then update its stored affinity data generation value to match the affinity data generation value stored on the LFBC as that value is more up-to-date than the value currently stored on Host B.

Figure 8:
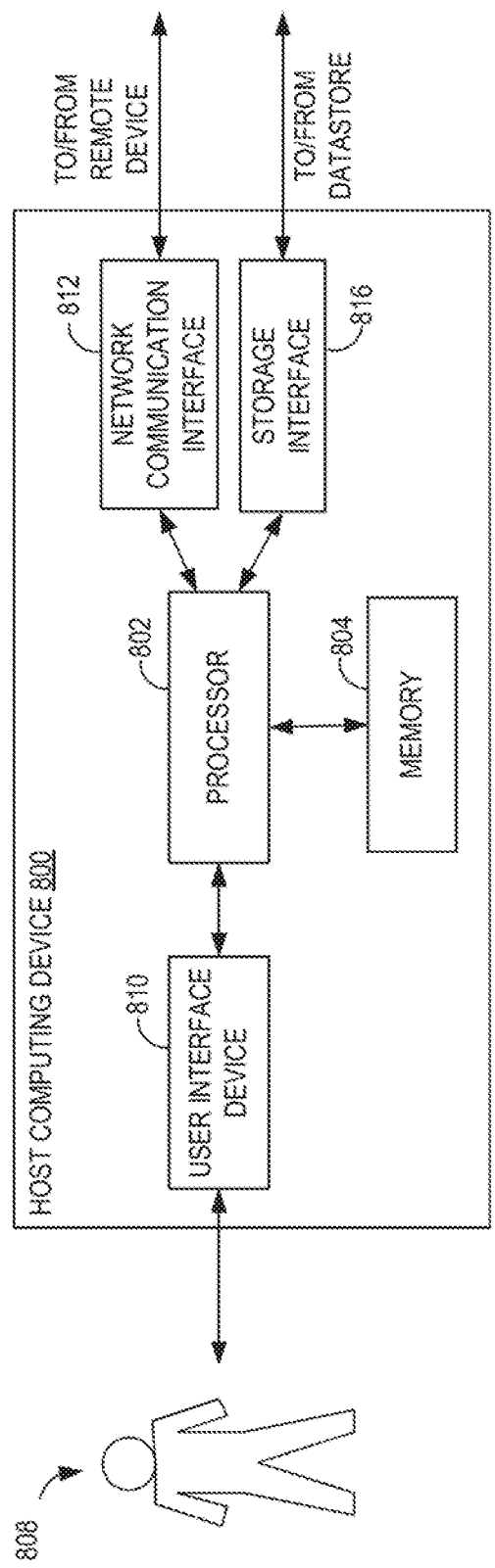
FIG. 8 illustrates a block diagram of an exemplary host computing device.

FIG. 8 is a block diagram of an example host computing device 800. Host computing device 800 includes a processor 802 for executing instructions. In some examples, executable instructions are stored in a memory 804. Memory 804 is any device allowing information, such as executable instructions and/or other data, to be stored and retrieved. For example, memory 804 may include one or more random access memory (RAM) modules, flash memory modules, hard disks, solid state disks, and/or optical disks.

Computer executable instructions may be provided using any computer-readable media that are accessible by the host computing device 800. Computer-readable media may include, for example, computer storage media such as a memory 804 and communications media. Computer storage media, such as a memory 804, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 804) is shown within the host computing device 800, it will be appreciated by a person skilled in the art, that the storage may be distributed or located remotely and accessed via a network or other communication link (e.g. using a network communication interface 812).

Host computing device 800 may include a user interface device 810 for receiving data from a user 808 and/or for presenting data to user 808. User 808 may interact indirectly with host computing device 800 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 808, while another device (e.g., a presentation device) operates to present data to user 808. In other examples, user interface device 810 has a single component, such as a touch screen, that functions to both output data to user 808 and receive data from user 808. In such examples, user interface device 810 operates as a presentation device for presenting information to user 808. In such examples, user interface device 810 represents any component capable of conveying information to user 808. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 802 and configured to be operatively coupled to an output device, such as a display device or an audio output device.

Host computing device 800 also includes a network communication interface 812, which enables host computing device 800 to communicate with a remote device (e.g., another computing device) via a communication medium, such as a wired or wireless packet network. For example, host computing device 800 may transmit and/or receive data via network communication interface 812. User interface device 810 and/or network communication interface 812 may be referred to collectively as an input interface and may be configured to receive information from user 808.

Host computing device 800 further includes a storage interface 816 that enables host computing device 800 to communicate with one or more data storage devices, which store virtual disk images, software applications, and/or any other data suitable for use with the methods described herein. In example examples, storage interface 816 couples host computing device 800 to a storage area network (SAN) (e.g., a Fibre Channel network) and/or to a network-attached storage (NAS) system (e.g., via a packet network). The storage interface 816 may be integrated with network communication interface 812.

The functionality described herein can be performed, at least in part, by one or more hardware logic components. According to an embodiment, the host computing device 800 is configured by the program code when executed by the processor 802 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as personal computers, servers, mobile devices, laptop computers, tablet computers, etc.

Figure 9:
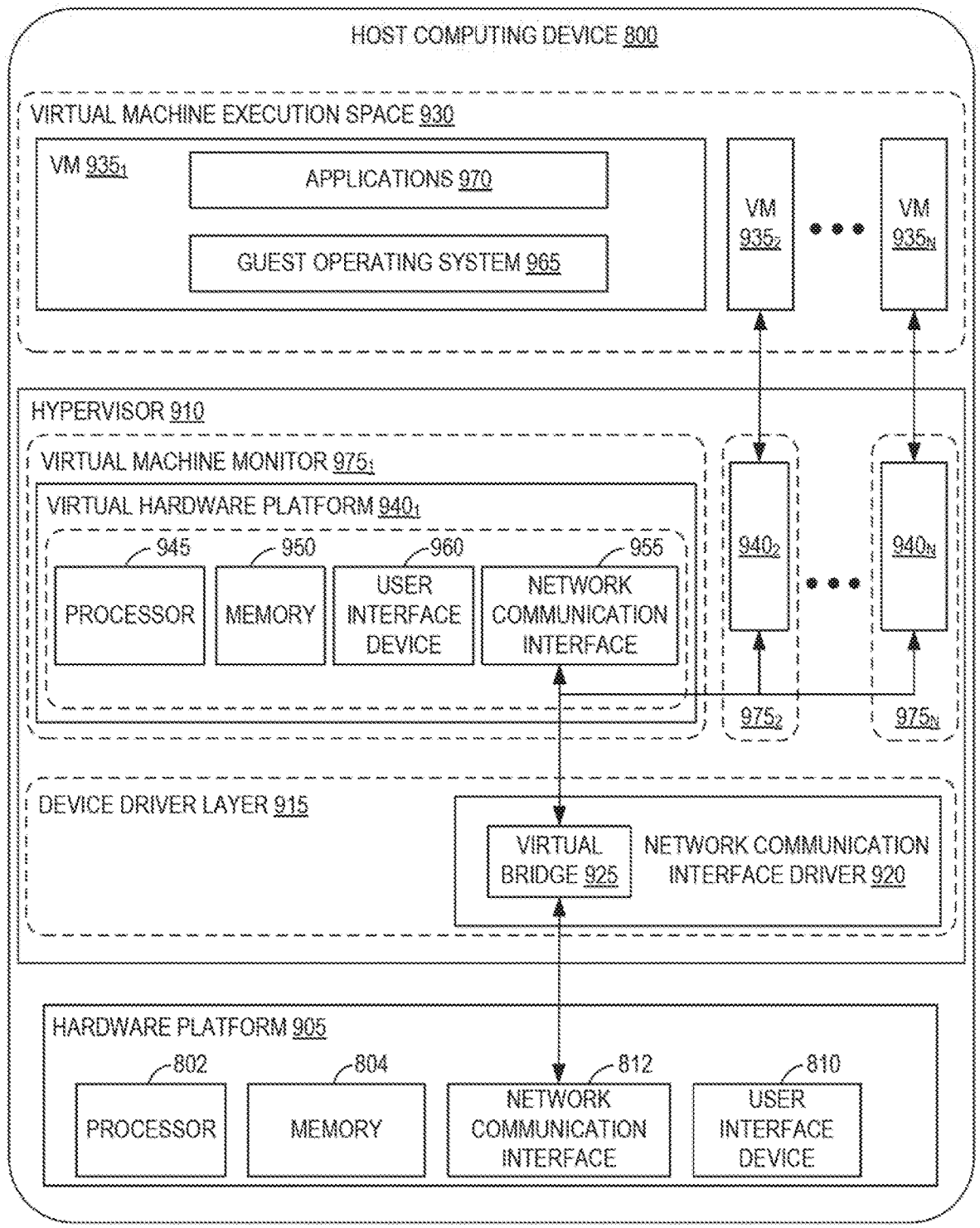
FIG. 9 illustrates a block diagram of VMs that are instantiated on a computing device, such as the host computing device shown in FIG. 8.

FIG. 9 depicts a block diagram of VMs $935_1$, $935_2$ . . . $935_N$ that are instantiated on host computing device 800. Host computing device 800 includes a hardware platform 905, such as an x86 architecture platform. Hardware platform 905 may include processor 802, memory 804, network communication interface 812, user interface device 810, and other input/output (I/O) devices, such as a presentation device. A virtualization software layer, also referred to hereinafter as a hypervisor 910, is installed on top of hardware platform 905.

The virtualization software layer supports a VM execution space 830 within which multiple VMs (VMs $935_1$-$935_N$) may be concurrently instantiated and executed. Hypervisor 910 includes a device driver layer 915, and maps physical resources of hardware platform 905 (e.g., processor 802, memory 804, network communication interface 812, and/or user interface device 810) to "virtual" resources of each of VMs $935_1$-$935_N$ such that each of VMs $935_1$-$935_N$ has its own virtual hardware platform (e.g., a corresponding one of virtual hardware platforms $940_1$-$940_N$), each virtual hardware platform having its own emulated hardware (such as a processor 945, a memory 950, a network communication interface 955, a user interface device 960 and other emulated I/O devices in VM $935_1$). Hypervisor 910 may manage (e.g., monitor, initiate, and/or terminate) execution of VMs $935_1$-$935_N$ according to policies associated with hypervisor 910, such as a policy specifying that VMs $935_1$-$935_N$ are to be automatically restarted upon unexpected termination and/or upon initialization of hypervisor 910. In addition, or alternatively, hypervisor 910 may manage execution VMs $935_1$-$935_N$ based on requests received from a device other than host computing device 800. For example, hypervisor 910 may receive an execution instruction specifying the initiation of execution of first VM $935_1$ from a management device via network communication interface 812 and execute the execution instruction to initiate execution of first VM $935_1$.

In some examples, memory 950 in first virtual hardware platform $940_1$ includes a virtual disk that is associated with or "mapped to" one or more virtual disk images stored on a disk (e.g., a hard disk or solid state disk) of host computing device 800. The virtual disk image represents a file system (e.g., a hierarchy of directories and files) used by first VM $935_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 915 includes, for example, a communication interface driver 920 that interacts with network communication interface 812 to receive and transmit data from, for example, a local area network (LAN) connected to host computing device 800. Communication interface driver 920 also includes a virtual bridge 925 that simulates the broadcasting of data packets in a physical network received from one communication interface (e.g., network communication interface 812) to other communication interfaces (e.g., the virtual communication interfaces of VMs $935_1$-$935_N$). Each virtual communication interface for each VM $935_1$-$935_N$, such as network communication interface 955 for first VM $935_1$, may be assigned a unique virtual Media Access Control (MAC) address that enables virtual bridge 925 to simulate the forwarding of incoming data packets from network communication interface 812. In an example, network communication interface 812 is an Ethernet adapter that is configured in "promiscuous mode" such that all Ethernet packets that it receives (rather than just Ethernet packets addressed to its own physical MAC address) are passed to virtual bridge 925, which, in turn, is able to further forward the Ethernet packets to VMs $935_1$-$935_N$. This configuration enables an Ethernet packet that has a virtual MAC address as its destination address to properly reach the VM in host computing device 800 with a virtual communication interface that corresponds to such virtual MAC address.

Virtual hardware platform $940_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 965 in order to execute applications 970 for an instantiated VM, such as first VM $935_1$. Virtual hardware platforms $940_1$-$940_N$ may be considered to be part of virtual machine monitors (VMM) $975_1$-$975_N$ that implement virtual system support to coordinate operations between hypervisor 910 and corresponding VMs $935_1$-$935_N$. Those with ordinary skill in the art will recognize that the various terms, layers, and categorizations used to describe the virtualization components in FIG. 9 may be referred to differently without departing from their functionality or the spirit or scope of the disclosure. For example, virtual hardware platforms $940_1$-$940_N$ may also be considered to be separate from VMMs $975_1$-$975_N$, and VMMs $975_1$-$975_N$ may be considered to be separate from hypervisor 910. One example of hypervisor 910 that may be used in an example of the disclosure is included as a component in VMware's ESX brand software, which is commercially available from VMware, Inc.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device', 'computing device' and the like are used herein to refer to any device with processing capability such that it can execute instructions. Those skilled in the art will realize that such processing capabilities are incorporated into many different devices and therefore the terms 'computer', 'computing device', and 'computing apparatus' each may include PCs, servers, laptop computers, mobile telephones (including smart phones), tablet computers, and many other devices.

While some virtualized embodiments are described with reference to VMs for clarity of description, the disclosure is operable with other forms of virtual computing instances (VCIs). A VCI may be a VM, a container, and/or any other type of virtualized computing instance.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for allocating memory in a data store based on affinity data and maintaining and propagating the affinity data to support the allocation processes. The illustrated one or more processors 802 together with the computer program code stored in memory 804 constitute exemplary processing means for receiving file data, determining affinity identifiers, selecting large and small file block clusters based on affinity identifiers, and asynchronously updating affinity metadata of large file block clusters based on affinity metadata of small file block clusters.

The term "comprising" is used in this specification to mean including the feature(s) or act(s) followed thereafter, without excluding the presence of one or more additional features or acts.

What is claimed is:

1. A system for storing file data in a data store, the system comprising:
    at least one physical processor, and
    at least one memory comprising computer program code, the at least one memory and the computer program code configured to, with the at least one processor, cause an electronic device to at least:
        receive file data associated with a file for storage in the data store, the data store comprising at least a large file block cluster that includes one or more small file block clusters, the large file block cluster and the small file block clusters each being associated with an affinity identifier;
        identify a large file block cluster in the data store based on the affinity identifier, the affinity identifier including an inode address, a file name or a file descriptor;
        select a small file block cluster in the identified large file block cluster based on free resources;
        store the file data in the selected small file block cluster; and
        update affinity metadata of the selected small file block cluster based on storing the file data, thereby associating the data representing the file to a region on the data store.

2. The system of claim 1, wherein the received file data is associated with a virtual computing instance hosted on a first host computing device; and
    the at least one memory and the computer program code are configured to, with the at least one processor, further cause the electronic device to at least:
    migrate the virtual computing instance from the first host computing device to a second host computing device, the first host computing device and second host computing device sharing the data store, the migration including associating the stored file data with the second host computing device;
    receive additional file data for storage, the additional file data and the stored file data associated with a file;
    determine an affinity identifier for the additional file data, wherein the determined affinity identifier for the additional file data is the same affinity identifier of the stored file data;
    store the additional file data in the selected small file block cluster based on the determined affinity identifier of the additional file data;
    update the affinity metadata of the small file block cluster based on storing the additional file data.

3. The system of claim 1, wherein selecting a small file block cluster based on the free resources includes:
    selecting a last used small file block cluster with the affinity identifier in affinity metadata when the last used small file block cluster with the affinity identifier in affinity metadata is determined to have free resources;
    selecting a previously used small file block cluster with the affinity identifier in affinity metadata when the previously used small file block cluster with the affinity identifier in affinity metadata is determined to have free resources;
    selecting a small file block cluster with no affinity identifier in affinity metadata when the small file block cluster with no affinity identifier in affinity metadata is determined to have free resources; and
    selecting a small file block cluster that is determined to have free resources.

4. The system of claim 3, wherein selecting a small file block cluster based on the free resources further includes:
    calculating a starting memory location in the large file block cluster based on the affinity identifier; and
    selecting a small file block cluster based on a proximity of the small file block cluster in the large file block cluster to the starting memory location.

5. The system of claim 3, wherein the large file block cluster includes affinity metadata including the affinity metadata of small file block clusters associated with the large file block cluster; and
    wherein selecting a small file block cluster based on the free resources further includes:
    identifying a small file block cluster based on the affinity metadata of the identified large file block cluster; and
    selecting the small file block cluster when the affinity metadata of the identified large file block cluster is confirmed accurate based on affinity metadata of the identified small file block cluster.

6. The system of claim 5, wherein the affinity metadata of the large file block cluster is updated asynchronously with affinity metadata of small file block clusters associated with the large file block cluster.

7. The system of claim 1, wherein affinity metadata of the selected small file block cluster includes at least one of an affinity identifier, an allocated resources value associated with the at least one affinity identifier, and a free resources value associated with the small file block cluster.

8. A computerized method comprising:
receiving, by a processor, file data associated with a file for storage in a data store, the data store comprising at least a large file block cluster that includes one or more small file block clusters, the large file block cluster and the small file block clusters each being associated with an affinity identifier;
identifying, by the processor, a large file block cluster in the data store based on the affinity identifier, the affinity identifier including an inode address, a file name or a file descriptor;
selecting, by the processor, a small file block cluster in the identified large file block cluster based on free resources;
storing, by the processor, the file data in the selected small file block cluster; and
updating, by the processor, affinity metadata of the selected small file block cluster based on storing the file data, thereby associating the data representing the file to a region on the data store.

9. The computerized method of claim 8, wherein the received file data is associated with a virtual computing instance hosted on a first host computing device; and the method further comprises:
migrating, by the processor, the virtual computing instance from the first host computing device to a second host computing device, the first host computing device and second host computing device sharing the data store, the migration including associating the stored file data with the second host computing device;
receiving, by the processor, additional file data for storage, the additional file data and the stored file data associated with a file;
determining, by the processor, an affinity identifier for the additional file data, wherein the determined affinity identifier for the additional file data is the same affinity identifier of the stored file data;
storing, by the processor, the additional file data in the selected small file block cluster based on the determined affinity identifier of the additional file data;
updating, by the processor, the affinity metadata of the small file block cluster based on storing the additional file data.

10. The computerized method of claim 8, wherein selecting a small file block cluster based on the free resources includes:
selecting, by the processor, a last used small file block cluster with the affinity identifier in affinity metadata when the last used small file block cluster with the affinity identifier in affinity metadata is determined to have free resources;
selecting, by the processor, a previously used small file block cluster with the affinity identifier in affinity metadata when the previously used small file block cluster with the affinity identifier in affinity metadata is determined to have free resources;
selecting, by the processor, a small file block cluster with no affinity identifier in affinity metadata when the small file block cluster with no affinity identifier in affinity metadata is determined to have free resources; and
selecting, by the processor, a small file block cluster that is determined to have free resources.

11. The computerized method of claim 10, wherein selecting a small file block cluster based on the free resources further includes:
calculating a starting memory location in the large file block cluster based on the affinity identifier; and
selecting a small file block cluster based on a proximity of the small file block cluster in the large file block cluster to the starting memory location.

12. The computerized method of claim 10, wherein the large file block cluster includes affinity metadata including the affinity metadata of small file block clusters associated with the large file block cluster; and
wherein selecting a small file block cluster based on the free resources further includes:
identifying a small file block cluster based on the affinity metadata of the identified large file block cluster; and
selecting the small file block cluster when the affinity metadata of the identified large file block cluster is confirmed accurate based on affinity metadata of the identified small file block cluster.

13. The computerized method of claim 12, wherein the affinity metadata of the large file block cluster is updated asynchronously with affinity metadata of small file block clusters associated with the large file block cluster.

14. The computerized method of claim 8, wherein affinity metadata of the selected small file block cluster includes at least one of an affinity identifier, an allocated resources value associated with the at least one affinity identifier, and a free resources value associated with the small file block cluster.

15. One or more non-transitory computer storage media having computer-executable instructions that, upon execution by a processor, cause the processor to at least:
receive file data associated with a file for storage in a data store, the data store comprising at least a large file block cluster that includes one or more small file block clusters, the large file block cluster and the small file block clusters each being associated with an affinity identifier;
identify a large file block cluster in the data store based on the affinity identifier, the affinity identifier including an inode address, a file name or a file descriptor;
select a small file block cluster in the identified large file block cluster based on free resources;
store the file data in the selected small file block cluster; and
update affinity metadata of the selected small file block cluster based on storing the file data, thereby associating the data representing the file to a region on the data store.

16. The one or more non-transitory computer storage media of claim 15, wherein the received file data is associated with a virtual computing instance hosted on a first host computing device; and
having computer-executable instructions that, upon execution by a processor, further cause the processor to at least:
migrate the virtual computing instance from the first host computing device to a second host computing device, the first host computing device and second host computing device sharing the data store, the migration including associating the stored file data with the second host computing device;
receive additional file data for storage, the additional file data and the stored file data associated with a file;
determine an affinity identifier for the additional file data, wherein the determined affinity identifier for the additional file data is the same affinity identifier of the stored file data;
store the additional file data in the selected small file block cluster based on the determined affinity identifier of the additional file data;

update the affinity metadata of the small file block cluster based on storing the additional file data.

17. The one or more non-transitory computer storage media of claim 15, wherein selecting a small file block cluster based on the free resources includes:
   selecting a last used small file block cluster with the affinity identifier in affinity metadata when the last used small file block cluster with the affinity identifier in affinity metadata is determined to have free resources;
   selecting a previously used small file block cluster with the affinity identifier in affinity metadata when the previously used small file block cluster with the affinity identifier in affinity metadata is determined to have free resources;
   selecting a small file block cluster with no affinity identifier in affinity metadata when the small file block cluster with no affinity identifier in affinity metadata is determined to have free resources; and
   selecting a small file block cluster that is determined to have free resources.

18. The one or more non-transitory computer storage media of claim 17, wherein selecting a small file block cluster based on the free resources further includes:
   calculating a starting memory location in the large file block cluster based on the affinity identifier; and
   selecting a small file block cluster based on a proximity of the small file block cluster in the large file block cluster to the starting memory location.

19. The one or more computer storage media of claim 17, wherein the large file block cluster includes affinity metadata including the affinity metadata of small file block clusters associated with the large file block cluster; and
   wherein selecting a small file block cluster based on the free resources further includes:
   identifying a small file block cluster based on the affinity metadata of the identified large file block cluster; and
   selecting the small file block cluster when the affinity metadata of the identified large file block cluster is confirmed accurate based on affinity metadata of the identified small file block cluster.

20. The one or more computer storage media of claim 19, wherein the affinity metadata of the large file block cluster is updated asynchronously with affinity metadata of small file block clusters associated with the large file block cluster.

* * * * *